April 30, 1946.   I. W. DOYLE ET AL   2,399,476
CAMERA
Filed Nov. 27, 1943   9 Sheets-Sheet 2

INVENTORS
Irving W. Doyle
Alfred G. Nash
BY Frank W. Stellwagen
Blair, Curtis + Hayward
ATTORNEYS April 30, 1946.　　I. W. DOYLE ET AL　　2,399,476

CAMERA

Filed Nov. 27, 1943　　9 Sheets-Sheet 6

INVENTORS
*Irving W. Doyle*
*Alfred G. Nash*
*Frank W. Stellwagen*
BY
*Blair, Curtis + Hayward*
ATTORNEYS April 30, 1946.                I. W. DOYLE ET AL                2,399,476
                                  CAMERA
                             Filed Nov. 27, 1943            9 Sheets-Sheet 8

INVENTORS
*Irving W. Doyle*
*Alfred G. Nash*
*Frank W. Stellwagen*
BY
*Blair, Curtis + Hayward*
ATTORNEYS Patented Apr. 30, 1946

2,399,476

UNITED STATES PATENT OFFICE 2,399,476

CAMERA

Irving W. Doyle, Massapequa, Alfred G. Nash, Richmond Hill, and Frank W. Stellwagen, Kew Gardens, N. Y., assignors to Fairchild Camera and Instrument Corporation, a corporation of Delaware Application November 27, 1943, Serial No. 511,904

11 Claims. (Cl. 95—53)

This invention relates to an aerial camera.

One of the objects of this invention is to provide an aerial camera characterized by sturdiness and durability, thus enabling its extended use under a wide variety of conditions. Another object is to provide a camera of this nature capable of dependably photographing terrain with high definition and accuracy, while operating at substantial altitudes. Another object is to provide an aerial camera adapted for day or night photography, without the necessity of any modifications, additional accessories or lens change. A further object is to provide an aerial camera capable during day time operation of taking a number of successive pictures at regular time intervals.

A still further object is to provide an aerial camera for night photography which automatically operates through a complete cycle of operation when subjected to the light of a flare. Another object is to provide an aerial camera for night photography wherein the shutter is automatically opened a predetermined amount of time before the flash of light from the flare, and closed a predetermined length of time after the flash. An additional object is to provide an aerial camera, the shutter of which, when the camera is used for night photography, can be opened substantially simultaneously with the emanation of light from the flare so as to be fully synchronized to take full advantage of the peak illumination of the flare. Another object is to provide a camera of the above nature which is completely self-contained and capable of operation either locally or remotely. Other objects will be in part apparent and in part pointed out hereinafter.

The invention accordingly consists in the features of construction, combinations of elements, and arrangements of parts as will be exemplified in the structure to be hereinafter described, and the scope of the application of which will be indicated in the following claims.

In the drawings, wherein we have shown one embodiment of our invention.

Similar reference characters refer to similar parts throughout the various views of the drawings.

Figure 1:
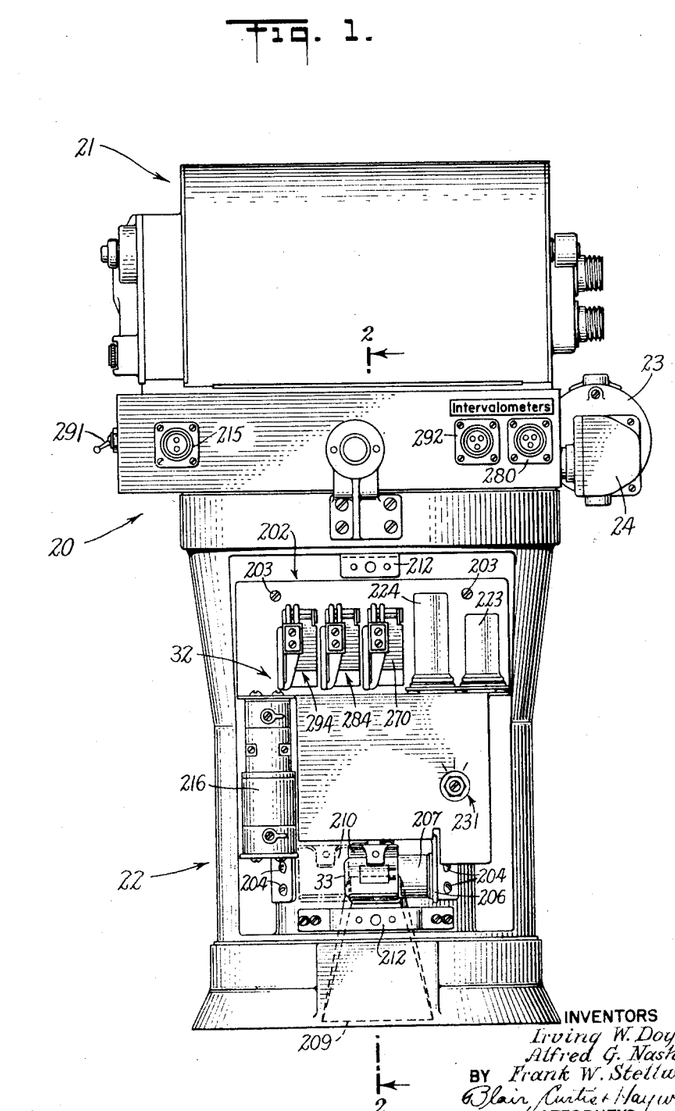
Figure 1 is a side elevation of our camera with a cover plate removed to show an amplifier unit detachably secured to the camera cone.

With reference to Figure 1, our camera comprises a main body or case, generally indicated at 20, to the top of which is detachably secured a magazine generally indicated at 21, and to the bottom of which is secured a cone generally indicated at 22. Case 20 has secured thereto a main driving motor 23, which is connected through suitable reduction gearing 24 to the case drive mechanism generally indicated at 25 in Figure 3, by means of a detachable coupling rod 26, this rod being wholly disposed within case 20.

Figure 2:
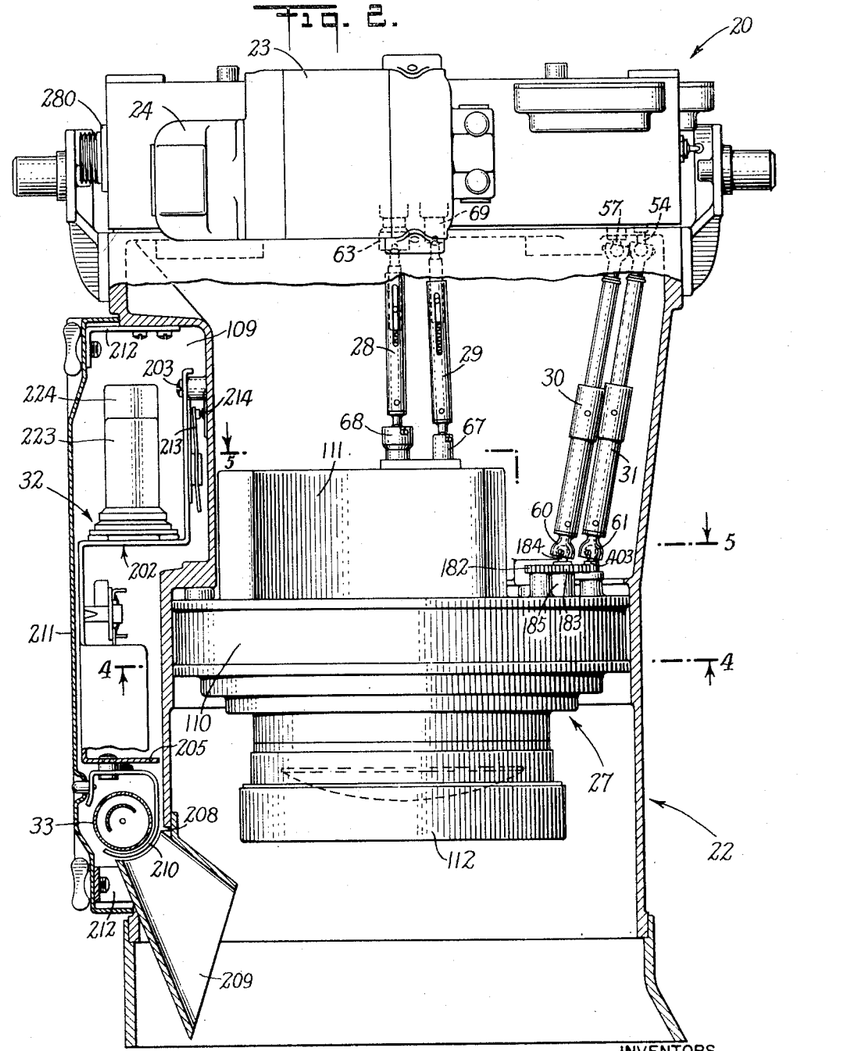
Figure 2 is a side elevation of our camera with the magazine removed taken at 90° from the view shown in Figure 1, a portion of the camera being broken away, and other portions being shown in section to illustrate the structure within the camera cone and within the amplifier unit. This view is taken substantially along the line 2—2 of Figure 1.

Referring to Figure 2, cone 22 has detachably mounted therein a shutter and lens assembly generally indicated at 27, and the various operating and control mechanisms of the shutter are connected to case drive 25 and control knobs by means of telescopic shafts 28, 29, 30 and 31. Cone 22 also has detachably secured thereto an amplifier unit generally indicated at 32 (Figure 1) which is adapted to amplify the electrical output of a light-responsive element, such as a photoelectric cell 33 (see also Figure 2). In general, it will now appear that when the camera is used for night photography, a flash of light impressed on photocell 33 results in an electrical output by the cell, which output is amplified by amplifier 32 to effect operation of shutter 27. Operation of the shutter (as will be pointed out in detail below) results in the automatic actuation of case drive mechanism 25, which rewinds the shutter spring, and through a driving connection 34 (Figure 3) with magazine 21 (Figure 1) winds a fresh supply of film into the focal plane of the camera, and also automatically sets the shutter for the next exposure.

The structural details and specific operation of magazine 21 (Figure 1) form no part of our present invention, and accordingly it will be noted that the magazine is preferably one containing strip film capable of being automatically fed from a supply spool and rewound on a rewind spool after each exposure in such a way that each unexposed portion of the film is accurately and securely positioned within the focal plane automatically after each exposure. Advantageously magazine 21 may correspond to the magazine shown in the copending application of Irving W. Doyle, Serial No. 462,267, filed October 16, 1942. It might be noted that inasmuch as magazine 21 is readily detachable from case 20, extended continuity of successive photographs is readily attainable, merely by replacing a magazine containing an exposed film with one containing unexposed film.

Figure 3:
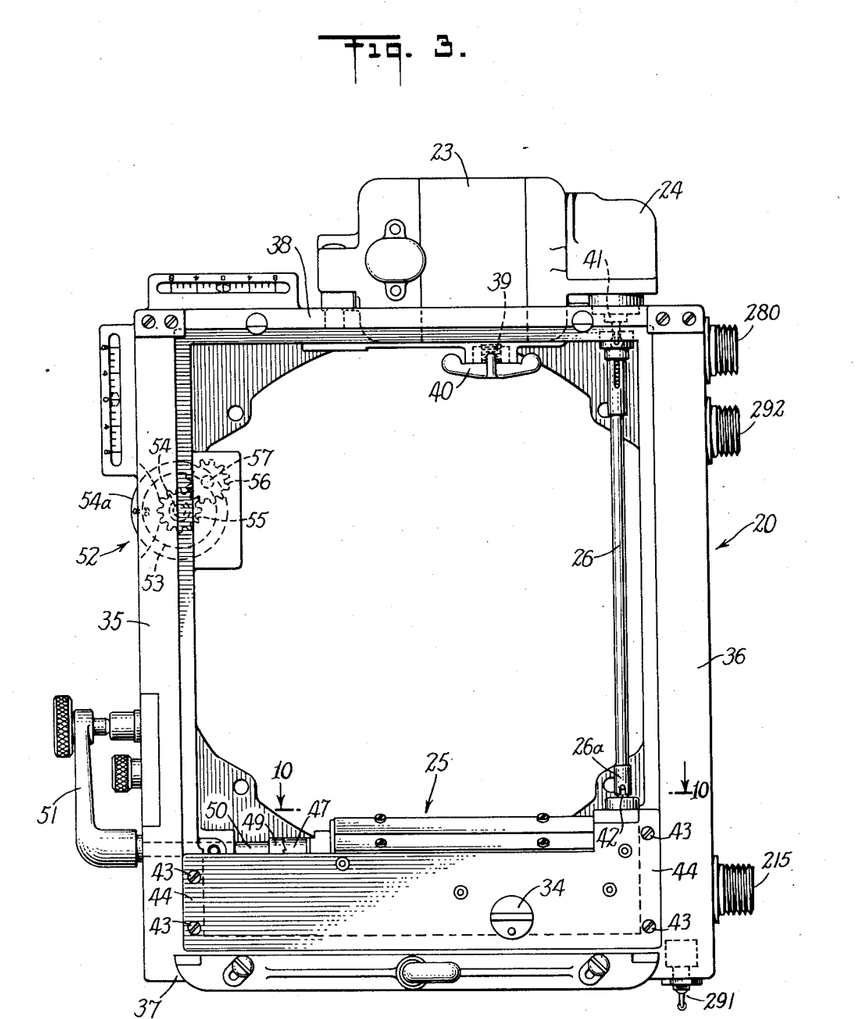
Figure 3 is a top plan view of the camera case.

Referring now to Figure 3, camera case 20 comprises a relatively heavy and rigid frame formed by front and back plates 35 and 36, respectively, and side plates 37 and 38. All of these plates are preferably integrally joined to form a rigid support for the magazine and cone assemblies. Motor 23 is preferably detachably secured to side plate 38 and carries contacts (not shown) which engage suitable contacts (also not shown) on the side plate when the motor is attached. Thus the motor may include a threaded stud 39 which projects through a hole in side plate 38 on which may be threaded a wing nut 40 to attach the motor to the case. Reduction gear 24 includes an output shaft 41 which also extends through case side 38 for connection with one end of shaft 26. The other end of shaft 26 is provided with a connection 26a adapted to connect with the input shaft 42 of case drive 25.

Case drive 25 is preferably a unitary assembly which may be detachably mounted within case 20 adjacent side 37 thereof in any suitable fashion, as by screws 43, which extend through flanges 44 on the case drive cover plate into front and back plates 35 and 36. The case drive includes a main drive shaft 45 (Figure 10) one end 45a of which is connected through suitable gearing 46 to the input shaft 42 of the case drive (see Figure 3). The other end 45b of case drive shaft 45 (Figure 10) carries an axially movable toothed coupling 47 which is pressed to the right, as viewed in Figure 10, by a spring 48 coiled on shaft end 45b, to mesh with another coupling 49 (Figure 3) secured to a crank shaft 50. Crank shaft 50 extends through front 35 of the camera case and has secured to its outer end a crank 51 which may be rotated clockwise, as viewed from the left-hand side of Figure 3, to effect hand operation of case drive 25 in the event of a power failure or breakdown of motor 23. So far as described, case drive 25 is generally similar to that shown in United States patent to S. M. Fairchild, 1,817,182.

To the front plate 35 of case 20 is secured a diaphragm and shutter speed adjusting mechanism generally indicated at 52, including a knurled setting disc 53 mounted on a shaft 54 and secured to a gear 55 which meshes with a gear 56 attached to a shaft 57. Thus when disc 53 is rotated, shaft 57 is also rotated. It might be noted that shaft 57 may be rotated either locally by manipulation of disc 53, or remotely by any suitable mechanism (not shown). Shaft 54 may be rotated by a knurled disc 54a. Shafts 54 and 57 (Figure 2) are respectively detachably secured to the upper ends of telescopic shafts 31 and 30. The lower ends of these shafts are respectively provided with sockets 61 and 60 connectible respectively with the shafts of the shutter speed control mechanism and the diaphragm control mechanism to be described hereinafter.

The case drive 20 (Figure 10) includes mechanism to be described below, through which a shaft drives a coupling 63 by way of gears 64 and 65 connected respectively to the shaft and a stud 66 which carries the coupling. Coupling 63 (Figure 2) is detachably connected to shaft 28, the lower end of which is detachably connected to a coupling 68. This coupling 68 is, as will be described, connected to the shutter operating mechanism, and when operated by the case drive winds the spring which opens and closes the shutter leaves. This operation of the shutter, as also will be described, actuates a coupling 67 which is detachably connected to the lower end of shaft 29, the upper end of which is connected to a coupling 69 connected to a shaft 70 (Figure 11) mounted in case drive 25. As will be described, rotation of shaft 70 causes certain contacts in the case drive to close energizing motor 23 (Figure 3) to drive the case drive through another cycle of its operation, in the course of which the shutter spring referred to is rewound. It will accordingly appear that case drive 25 comprises instrumentalities by which the various mechanisms which comprise the shutter assembly 27 are operated.

Figures 9, 10:
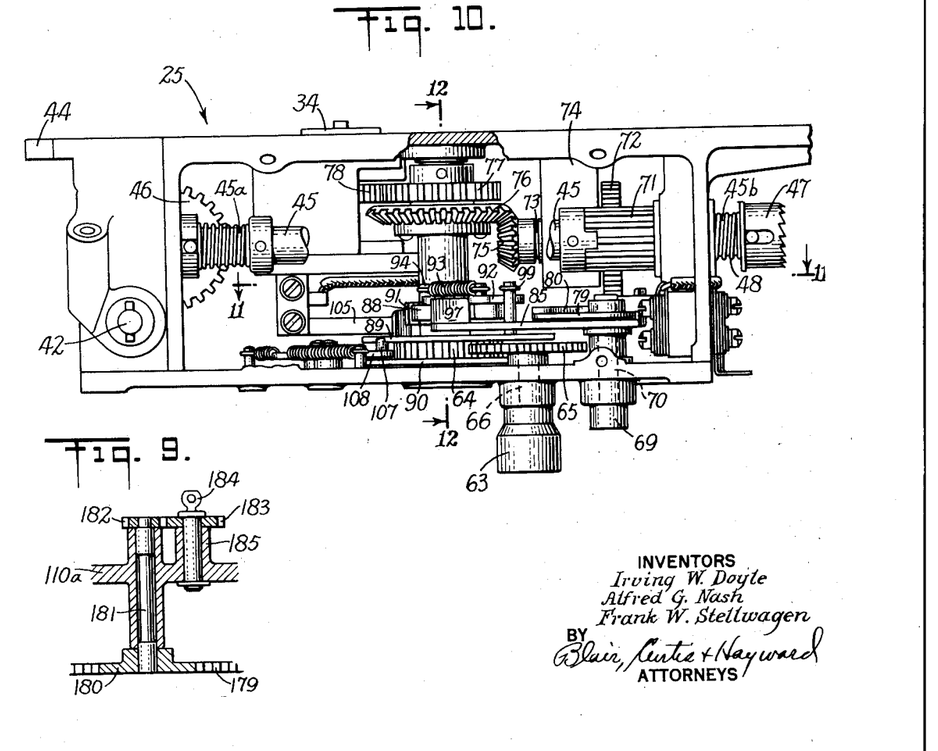
Figure 9 is a vertical section taken along the line 9—9 of Figure 5.
Figure 10 is an enlarged fragmentary sectional elevation taken along the line 10—10 of Figure 3, portions being broken away to show the operating mechanism of the case drive.
Figure 12:
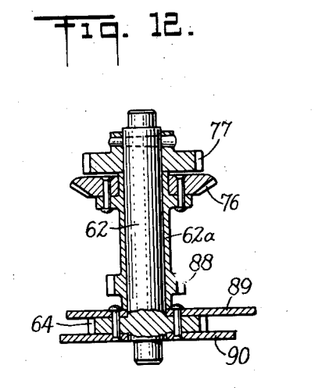
Figure 12 is a sectional elevation taken along the line 12—12 of Figure 10; and, Figure 13 is a wiring diagram showing the control system for our camera.

As shown in Figure 10, the main shaft 45 in case drive 25 has connected thereto a gear 71 which meshes with a larger gear 72 mounted on one end of a shaft 73 journaled in a suitable boss 74 on the housing of the case drive. On the other end of shaft 73 is a bevel gear 75 which meshes with a larger bevel gear 76 mounted on a shaft 62 (Figure 12). The upper end of shaft 62 has secured thereto a spur gear 77 which meshes with another spur gear 78 (Figure 10) fastened to a stud shaft (not shown) rotatably mounted in the case drive housing. The exterior end of this stud shaft has attached thereto the driving connection 34 which may conveniently take the form of a tongued disc by which the film magazine 21 (Figure 1) is operated as described above. The several gears within the case drive 25 (Figure 10) just described, are so proportioned that one revolution of shaft 62, i. e. one operative cycle of the case drive, effects one cycle of operation of the film magazine when driven by the driving connection or slotted disc 34.

Figure 11:
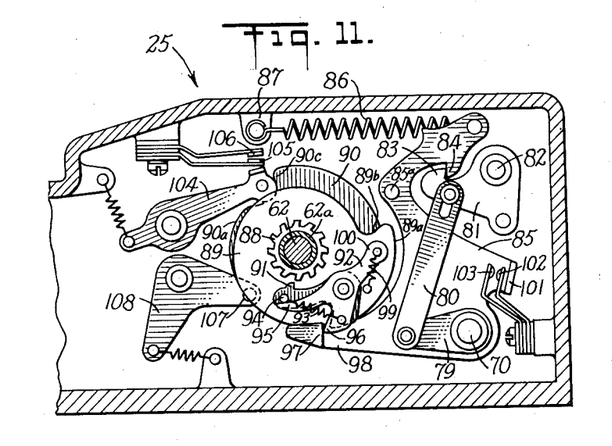
Figure 11 is a horizontal section taken along the line 11—11 of Figure 10.

As noted above, operation of shutter mechanism 27 (Figure 2) rocks coupling 67 which in turn, through connecting rod 29, rocks coupling 69 and accordingly shaft 70 (Figure 10). The rocking of this shaft, which is also shown in Figure 11, occurs as the shutter opens and closes and, being connected to an arm 79, rocks this arm counterclockwise, as viewed in Figure 11. Arm 79 is connected by a link 80 to a dog 81 pivotally mounted on a stud shaft 82 secured to the housing of case drive 20, and this dog includes a tooth 83 which when in its upper position, i. e. the Figure 11 position, engages with a tooth 84 formed on the upper end of a latch plate 85. This latch plate is pivotally mounted on shaft 70 and is under a constant counterclockwise bias by a spring 86, one end of which is fastened to the upper end of the latch plate, and the other end of which is fastened to a boss 87 extending from the case drive housing. Thus, it will appear that when the camera shutter is operated, shaft 70 is rocked to disengage teeth 83 and 84 of the dog and latch plate respectively, thus permitting spring 86 to rock latch plate 85 counterclockwise. This movement of the latch plate causes the case drive to be reset in a manner to be described.

As described above, gear 64 is driven by shaft 62 (Figures 11 and 12). On this shaft is loosely mounted a sleeve 62a (Figure 12) to which is secured a driving ratchet 88. On the lower end of shaft 62 are a pair of cams 89 and 90 disposed on opposite sides of gear 64 and fastened thereto. A driving pawl 91 (Figure 11) is pivotally mounted on cam 89, and on the same pivot is a control dog 92. A spring 93 has its opposite ends fastened respectively to the driving pawl and controlling dog to hold them normally in the relative positions shown in Figure 11, in which the stud 94 on the pawl (the stud to which spring 93 is attached) bears against an arm 95 on the dog. In this position the tail 96 of the dog rests against a lug 97 on an extension 98 of latch plate 85 to hold the pawl out of engagement with driving ratchet 88. A spring 99 has one end connected to cam 89 and its other end connected to another arm 100 on dog 92 so that when latch plate 85 is rocked counterclockwise by spring 86, lug 97 on the latch plate is disengaged from tail 96 of the dog, and spring 99 rocks the dog and pawl assembly clockwise, thus bringing pawl 91 into engagement with ratchet 88. If the ratchet 88 is rotated clockwise, as viewed in Figure 11, shaft 62 is also rotated by reason of the driving connection formed therebetween by driving pawl 91 and cam 89. Of course, when shaft 62 is rotated, gears 64 and 77, which are pinned to the shaft, rotate, the former to tension the shutter spring, as will be described, and the latter to operate the magazine as described above.

As shown in Figure 11, latch plate 85 includes an upstanding lug 101 which, when the latch plate rocks counterclockwise upon shutter operation, as described, engages a movable contact 102 and forces it into engagement with another contact 103. Engagement between these contacts establishes the circuit in which motor 23 (Figure 3) is connected to energize the motor and accordingly drive the case drive. As cam 90 (Figure 11) rotates clockwise, its surface 90a rocks a spring-biased arm 104 counterclockwise to cause engagement between normally open contacts 105 and 106. These contacts are connected in parallel with contacts 102 and 103 and accordingly maintain the case drive motor energized when contacts 102 and 103 separate, by reason of clockwise movement of latch plate 85 prior to the end of the operative cycle of the case drive. Cam 89 also includes a surface 89a which, as the cam rotates clockwise, engages a pin 85a extending from latch plate 85, and forces the latch plate clockwise against the bias of spring 86. When the latch plate has been rocked sufficiently its tooth 84 engages with dog tooth 83 so that the latch plate is locked in the position shown in Figure 11. During this clockwise movement of the latch plate, contacts 102 and 103 open, but as the operative cycle of the case drive is not complete at this point, the case drive continues to be driven by its motor as contacts 105 and 106 are still closed. These contacts remain closed until arm 104 is permitted to rock clockwise, by reason of the follower on its end riding into a low spot on cam 90. When this occurs, the cycle of the case drive is complete and the circuit to its driving motor is broken. As noted above, the case drive is not only operating the film magazine, but is also winding the shutter spring. As the shutter spring is of substantial strength, cam 90 is provided with a stop 90c which, by reason of its inability to pass the follower on the end of arm 104 in counter-clockwise direction prevents reverse movement of the cam and accordingly the case drive from the driving force exerted by the shutter spring. Cam 89 is also provided with a stop 89a which coacts with a pin 107 on a spring-biased lever 108 to prevent counter-clockwise movement of the cam by the shutter spring.

It will now appear that the cycle of operation of case drive 20 is initiated by operation of the shutter, and that in the course of the operative cycle the film magazine is operated and the shutter spring is retensioned automatically without either being able to overrun, thus precluding damage to the magazine or wastage of film or overtensioning of the shutter spring.

Referring now to Figure 2, the camera cone 22 includes a recess 109 within which amplifier 32 is secured and the base of this recess, together with other suitable bosses formed about the inner wall of the cone provide mounting surfaces on which the shutter mechanism 27 may be detachably secured.

Shutter mechanism 27 includes a casing 110 within which are disposed the mechanisms which control the opening and closing of the shutter leaves, the position of the iris diaphragm and the retard mechanism which controls the shutter speed. Casing 110 has secured to its upper side a housing 111 in which are disposed other shutter control mechanisms to be described, and to the bottom of casing 110 is detachably secured a lens mount 112 in which suitable lenses are disposed.

Figure 6:
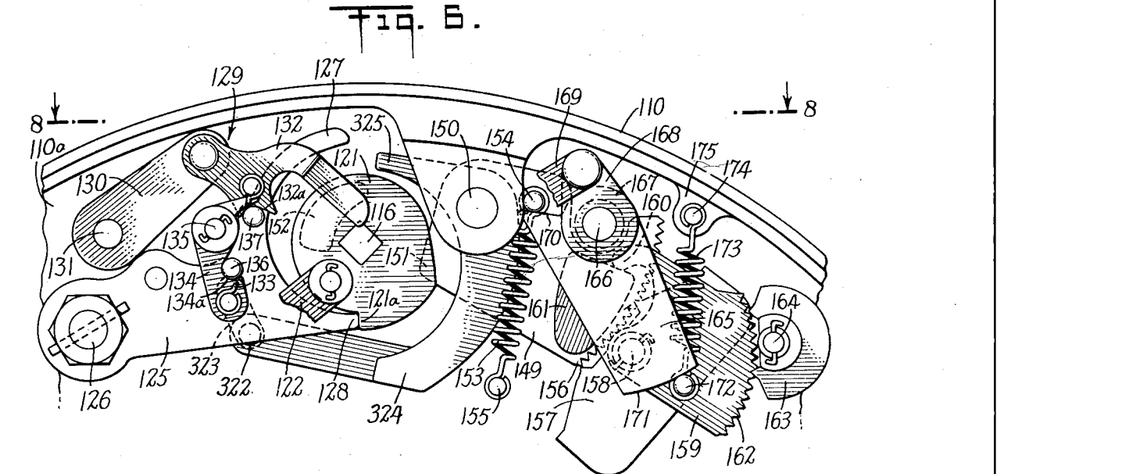
Figure 6 is a greatly enlarged view of the shutter operating and retard mechanism shown at the top of Figure 4.
Figure 7:
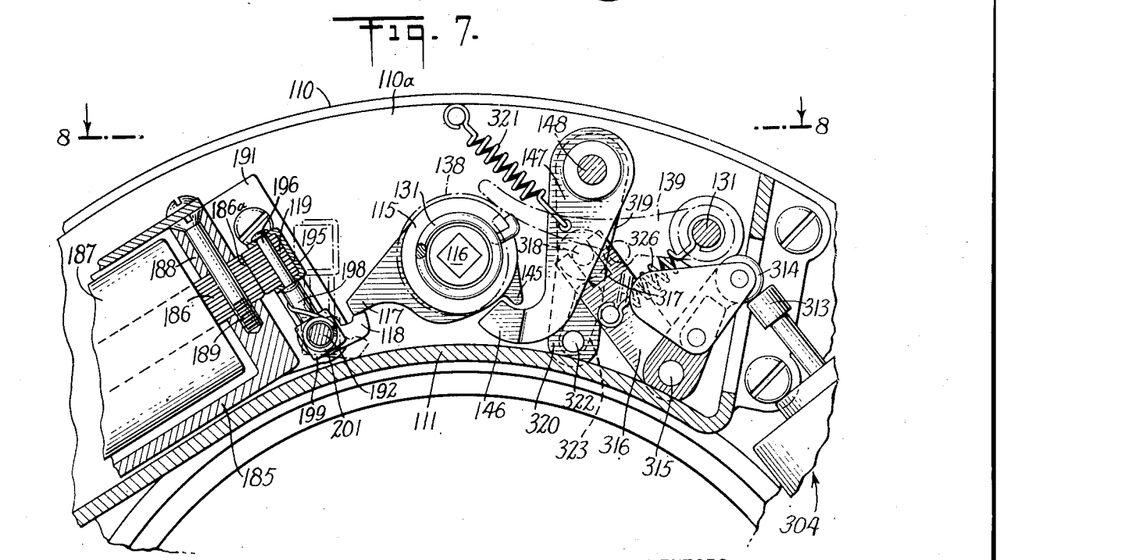
Figure 7 is a greatly enlarged view of other portions of the shutter operating mechanism shown at the top of Figure 5.

The mechanisms in casing 110 are better shown in Figures 4, 6, 7, and 8, and we will first describe the mechanism which opens and closes the shutter leaves. We have mentioned above the spring which when under tension and released opens and closes the shutter leaves. This spring is shown at 113 in Figure 8, having its upper end connected to a cup 114 and its lower end to a cup 115. The spring and cups are disposed about a shaft 116, the lower cup being directly connected thereto. Upper cup 114 is loosely mounted on the upper end of shaft 116 and is connected in any suitable manner to coupling 68. Hence it will appear that when lower cup 115 is held against rotation, as will be described, operation of the case drive 20 (Figure 2) rotates coupling 68 so that when the case drive finishes its cycle of operation, spring 113 (Figure 8) is wound. Lower spring cup 115 includes a projection 117 which extends outwardly of the cup to a point where it can be engaged and held, as shown in Figure 7, by a lug 118 secured to the armature 119 of a holding magnet generally indicated at 120. When magnet 120 is energized, its armature 119 is in the position shown in Figure 7. Hence, projection 117 of the spring cup is held against rotation. When, however, the magnet is deenergized, spring 113 (Figure 8) drives projection 117 past lug 118 and as cup 115 is attached to shaft 116, the shaft is rotated to effect opening and closing of the shutter leaves.

Figure 4:
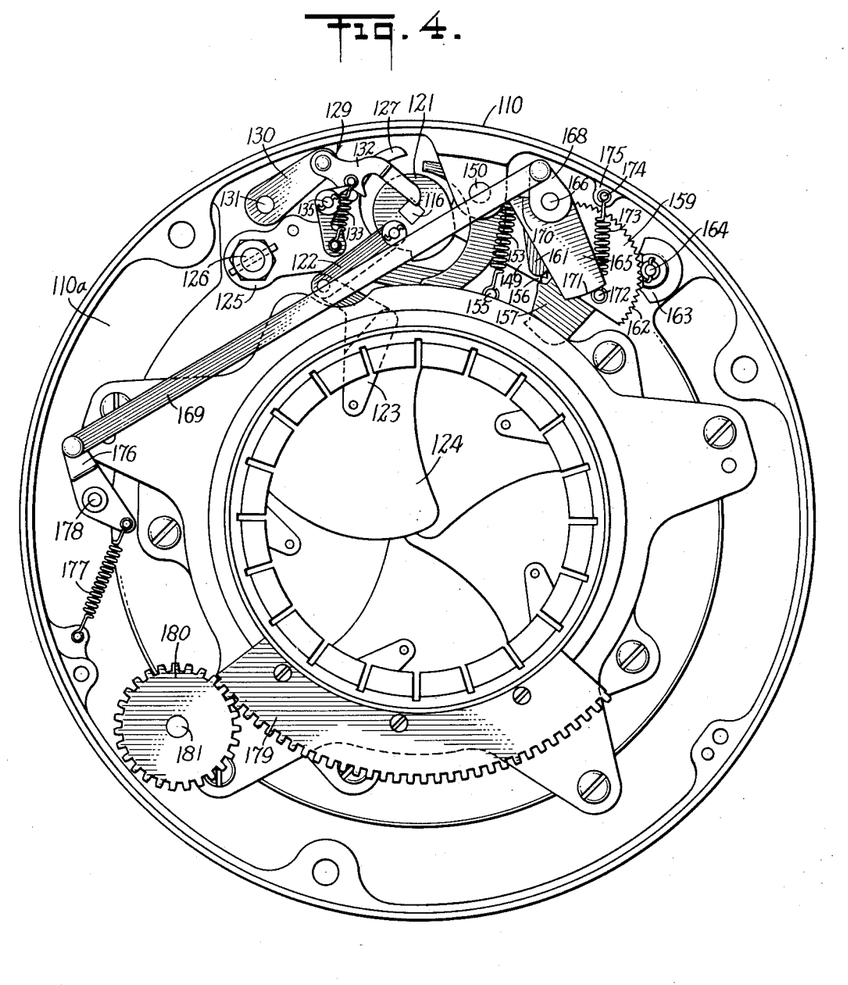
Figure 4 is an enlarged horizontal section through the shutter taken along the line 4—4 of Figure 2.

The lower end of shaft 116 extends through the top 110a of casing 110 and has secured to it below the casing top a cam 121. As shown in Figure 4, cam 121 is connected by a link 122 to a bell crank 123, and the other end of this bell crank is connected to one of the several shutter leaves 124. These shutter leaves may be interconnected in the manner shown in United States Letters Patent 1,626,032 to S. M. Fairchild. Thus, when cam 121 rotates once, shutter leaves 124 are opened and closed by the driving effect of the linkage comprising link 122 and bell crank 123.

Cam 121 (Figure 6) is automatically stopped at the end of one rotation, and the shutter is automatically reset for a subsequent operation. To this end we provide a bifurcated lever 125 pivoted on the top 110a of casing 110 as at 126. Lever 125 includes a follower or reset arm 127 and a stop arm 128. These two arms are shown in Figure 6 in the position wherein stop arm 128 engages an abutment 121a on cam 121 to stop rotation of the cam at the end of the shutter operation. During the automatic resetting operation of the shutter, and also as shutter spring 113 (Figure 8) is rewound, lever 125 (Figure 6) is rocked clockwise in order to clear stop arm 128 from cam stop 121a to prepare the shutter for a subsequent operation, it being noted that magnet 120 (Figure 8) is re-energized during the resetting operation so that engagement between projection 117 of the lower spring cup 115 and lug 118 on the magnet armature 119 prevent rotation of cam 121 (Figure 6) which would otherwise occur by reason of the separation of stop arm 128 and cam stop 121a. This clockwise rocking of lever 125 is effected by a reset lever generally indicated at 129. This lever comprises a link 130 connected to the lower end of a rod 131 (see Figure 8) which extends upwardly through casing top 110a and through the top of housing 111. The other end of link 130 (Figure 6) is pivotally connected to a link 132 connected as by a spring 133 to a link 134 pivoted at 135 to casing 110. With the parts in the position shown in Figure 6, a hook portion 134a in link 134 engages a pin 136 projecting from lever 125 and a surface 132a of link 132 rests against a pin 137 also carried by lever 125. These parts operate in a manner specifically described in Sherman N. Fairchild's Patent 1,626,032 to effect shutter operation.

As shutter spring 113 (Figure 8) is rewound, upper spring cup 114 rotates. Formed on the upper portion of spring cup 114 is a cam 138 which engages the free end of a lever 139 as it rotates with the spring cup. The other end of this lever is connected to shaft 131 and accordingly the shaft is rocked as the free end of lever 139 rides over cam 138 to reset the trip lever 129.

The upper end of shaft 131 (Figure 8) which extends through the top of housing 111 has connected thereto an arm 140 the upper end of which carries a pin 141. This pin is connected by a spring 142 to a stationary pin 143 fastened to the top of housing 111 so that when the free end of lever 139 drops off the high spot of cam 138 at the end of the winding cycle, spring 142 pulls arm 140 in a direction to rock shaft 131 oppositely to the direction in which it was rocked by cam 138. This reverse action of shaft 132 is transmitted to reset lever 129 (Figure 6), causing the lever to disengage stop 128 from cam stop 121a.

As has been noted above, the case drive 20 (Figure 10) is automatically reset during opening and closing of the shutter. This is effected as follows: as lower spring cup 115 (Figure 8) rotates during shutter operation, it rotates a cam 144 and accordingly a cam lobe 145 (Figure 7). Projecting into the path of this cam lobe is the curved end 146 of a lever 147 (see also Figure 8) fastened to a shaft 148, the lower end of which is rockably mounted in top 110a of casing 110. The upper end of shaft 148 projects through the top of housing 111 and is connected to the coupling 67 which, as shown in Figures 2 and 10, is connected by rod 29 to coupling 69 and accordingly to shaft 70 which operates dog 81 (Figure 11). Thus it will appear that operation of the shutter causes, through the train of mechanisms comprising cam 144 (Figure 8) lever 147, shaft 148, coupling 67, rod 29 (Figure 2), coupling 69 (Figure 10) shaft 70, and dog 81 (Figure 11), release of latch plate 85 and engagement of contacts 102 and 103 to effect operation of case drive 20 as hereinbefore described. Lever 147 is held in contact with cam 144 by spring 321 one end of which is fastened to a hole in lever 147 and the other end to a pin in casing 110.

Figure 8:
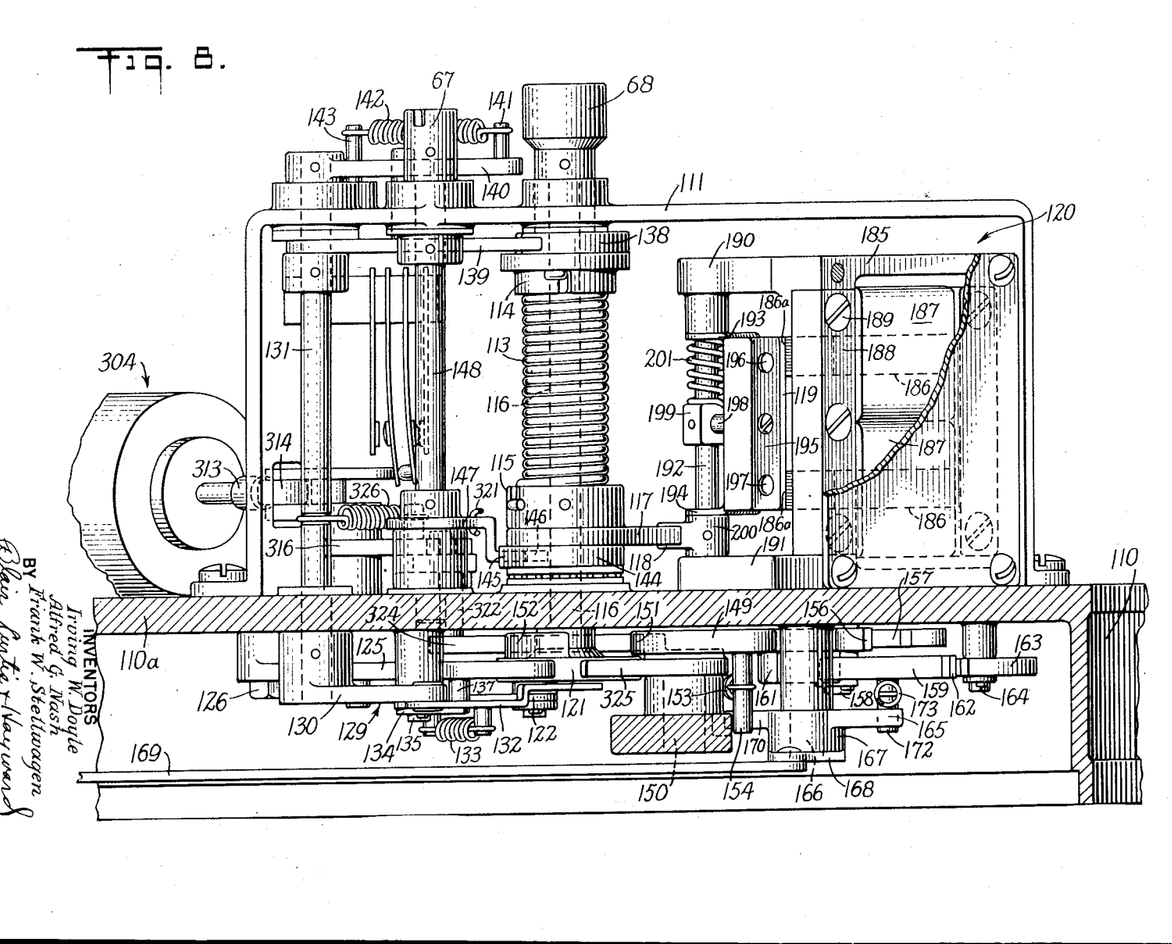
Figure 8 is an enlarged fragmentary sectional view of a portion of the shutter operating mechanism as viewed along the line 8—8 of Figure 6.

Although shutter 27, as described above, is capable of a speed of 1/150 of a second or more, such high shutter speeds are used for only daylight operation of the camera. When the camera is used for night photography, it is sometimes necessary to use a substantially low shutter speed, for example, a speed as low as 1/25 of a second. To this end, we have provided a retard mechanism which is shown in Figures 4, 6, and 8. As shown in Figure 6, a segment 149 is pivotally mounted on a stud 150 secured to and extending downwardly from the top of casing 110. Segment 149 is provided with a lobe 151 adapted to be engaged by a cam 152 secured to the bottom of shutter cam or crank 121 during the rotation thereof. Engagement between cam 152 and lobe 151 rocks segment 149 counterclockwise, as viewed in this figure, against the bias of a spring 153, one end of which is fastened to a pin 154 projecting from the segment, and the other end of which is fastened to a pin 155 secured to the top of casing 110. Segment 149 is also provided with a number of teeth 156 which coact with the points of an escapement pallet 157 pivotally mounted on a stud 158 fastened to the top of casing 110. It will now appear that after cam 121 has rotated approximately 160°, at which point the shutter leaves are wide open, cam 152 strikes segment lobe 151 and the speed of rotation of cam 121 is accordingly limited to the rate of escapement between segment teeth 156 and the points on pallet 157.

To attain a still lower shutter speed, we have provided an additional segment 159 pivoted on pin 158 and provided with a lobe 160 adapted to be engaged by a boss 161 carried by segment 149. Segment 159 has teeth 162 which coact with the points of an escapement pallet 163 pivoted on a pin 164 secured to the casing. Thus when boss 161 on segment 149 engages segment lobe 160 of the second segment 159, the rate of movement of the first segment 149 is accordingly further reduced by an amount proportional to the rate of escapement between segment teeth 162 and escapement pallet 163.

From the above it will appear that the amount of delay imparted to rotation of shutter cam or crank 121 is a function of the period of engagement between cam 152 and segment lobe 151. Accordingly, to provide a wide selection of shutter speeds, we have provided an adjusting mechanism which includes a plate 165 pivotally mounted on shaft 166. A hub 167 is fastened to arm 165 and has extending therefrom a lever 168 to the free end of which is connected a long link 169 (see also Figure 4). Plate 165 is provided with a shoulder 170 adapted to engage pin 154 on segment 149 and also has a surface 171 adapted to engage a pin 172 fastened to segment 159. Pin 172 also comprises an anchor for one end of a spring 173, the other end of which is anchored by a pin 174 fastened to a lug 175 extending from the wall of casing 110. In passing, it is noted that spring 173 constantly biases segment 159 counterclockwise as viewed in Figure 6.

It will now appear that as plate 165 is pivoted clockwise so that its shoulder 170 engages segment pin 154 and its surface 171 engages segment pin 172, segment 149 is rocked counterclockwise while segment 159 is rocked clockwise. Thus segment 149 may be pivoted to such an extent by this movement of plate 165 that its lobe 151 is moved out of the path of cam 152. Of course when this cam and segment lobe 151 do not engage, there is no retard imparted to the operation of the shutter. Conversely, as plate 165 is pivoted counterclockwise, spring 153 draws segment 149 clockwise to move its lobe 151 into the path of cam 152, while spring 173 pivots segment 159 counterclockwise. Hence, by selecting the position of plate 165, the period of engagement between cam 152 and segment lobe 151 can be determined and accordingly the desired shutter speed can be selected.

Plate 165 is set to the desired position by means of link 169 (Figure 4) the left-hand end of which, as viewed in this figure, is pivotally fastened to one arm of a bell crank 176. The other arm of this bell crank is secured to one end of a spring 177, the other end of which is fastened to a lug extending from the wall of casing 110. Bell crank 176 is fastened to one end of a shaft 178 which extends upwardly through the top of casing 110 (Figure 2) where its upper end carries a lever 400 having an arm 401. Lever 400 is biased by spring 177 so that arm 401 is normally in engagement with a cam 402 fastened to a shaft 403 the upper end of which is connectable with coupling 61 on connecting rod 31. As noted above, this rod is controlled by the manipulation of disc 54, thus to set the shutter speed control mechanism. Also fastened to shaft 403 is a detent plate 404 which coacts with a spring urged ball 405 which rides into notches formed in the plate as they register with the ball. These notches are arranged as to number and position in accordance with the variety of shutter speeds desired. Thus the shutter can be expeditiously set for the desired speed of operation.

Preferably our shutter 27 (Figure 4) is provided with a conventional iris diaphragm which accordingly includes a gear segment 179 which meshes with a gear 180 fastened to a shaft 181 secured in and extending through the top of casing 110 (see Figure 9). To the upper end of this shaft is secured a small gear 182 which meshes with another gear 183 secured to a stud shaft 184 pivotally mounted in a boss 185 extending upwardly from the top of casing 110. The upper end of stud shaft 184 (Figure 2) is connectable to socket 60 on the lower end of rod 30 which may be manipulated as hereinbefore described by disc 53 (Figure 3) to rotate shaft 184 and accordingly shaft 181 (Figures 9 and 4), thus to rotate gear 180 and swing segment 179 to adjust the iris diaphragm.

As indicated hereinabove, our camera is well adapted for both day and night photography. Night photography, particularly under conditions of modern warfare, in many instances necessitates the use of flares which burn with explosive effect over an extremely minute fraction of a second and have a peak illumination of an even smaller fraction of a second. In order to utilize this peak illumination, it is accordingly necessary that the camera shutter be open when the illumination is at its maximum, and it is to this end that we have provided the holding magnet 120 briefly referred to hereinabove. As noted above, after the shutter spring 113 (Figure 8) has been rewound, stop arm 128 (Figure 6) is moved away from its stopping position shown so that the only thing that restrains the spring from operating the shutter is the engagement between projection 117 of the spring cup and lug 118 which is held in the position shown when the magnet 120 is energized. Thus, if the magnet is rapidly deenergized, there is only an inappreciable delay in the start of the shutter operation. In reducing this delay to a minimum, we have provided magnet 120 having structure and characteristics now to be described, and a system of rapidly deenergizing the magnet which will be described later.

Figure 5:
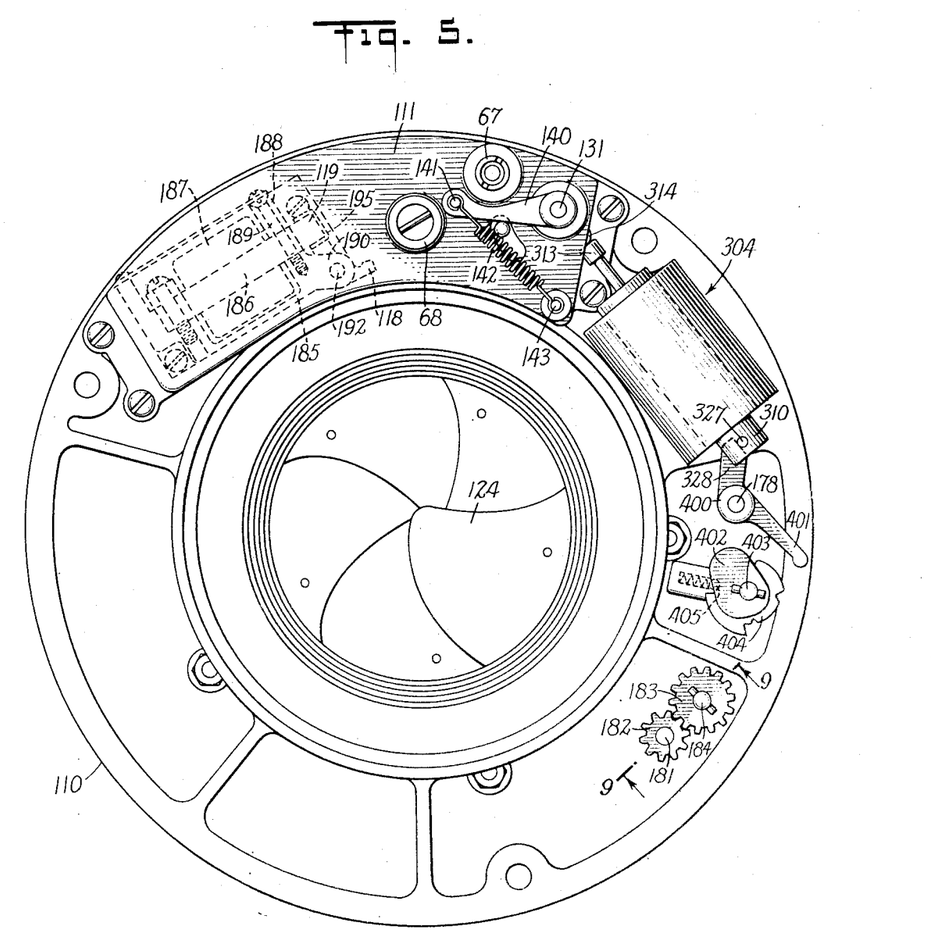
Figure 5 is an enlarged horizontal staggered section taken along the line 5—5 of Figure 2.

Magnet 120 is shown in Figures 5, 7, and 8 and comprises, as shown in Figure 8, a casting 185 within which are disposed cores 186 and coils 187. Cores 186 are made up of a number of U-shaped laminations stacked to the desired height to form a U-shaped core, the legs of which are disposed respectively within the two coils 187. The cores and coils are clamped in place within casting 185 by suitable clamping strips 188 fastened to the casting by screws 189 (see Figure 7). Preferably the pole faces of the core are ground flat to even up the variations between the many laminations.

Casting 185 (Figure 8) includes ears 190 and 191 which pivotally receive the ends of a shaft 192. The legs 193 and 194 of a U-shaped bracket 195 are loosely carried by shaft 192 and to the bracket is riveted the armature 119. This armature also consists of a suitable number of flat preferably rectangular laminations which are forced in between the two sides of a channel shape which forms the top of bracket 195 and then ground to remove inequalities. Preferably the armature assembly is chromium plated after assembly as is also the magnet body. The rivets 196 and 197 which fasten the armature to the bracket extend through the sides of the channel shape and through the laminations which comprise the armature, thus holding the armature and bracket together in tight, unitary assembly. Extending through the channel shaped sides and armature 119 is a loosely fitting pin 198 fastened at its left-hand end, as viewed in Figure 8, to a collar 199 which is pinned to shaft 192. As noted above, bracket legs 193 and 194 are also loosely fitted on shaft 192, and this loose fit, together with the loose fit of pin 198 in the armature, is provided so that the armature may float slightly in order to seat evenly against the pole faces 186a (Figure 7) of the magnet core 186. Also secured to shaft 192 (Figure 8) is a collar 200, and it is from this collar that lug 118 extends.

Magnet 120 is preferably so adjusted that a gap on the order of .005 inch to .010 inch exists between armature 119 and the pole faces when the lug 118 just rests against the spring cup projection 117. The relationship between lug 118 and spring cup projection 117 is such that when magnet 120 is energized to attract armature 119 and thereby close the above-mentioned gap to zero, lug 118 cams projection 117 backward and accordingly rocks shaft 116 and shutter cam 121 (Figure 6) sufficiently to back cam stop 121a away from stop arm 128 thus to facilitate movement of the stop arm out of the path of stop 121a as heretofore described.

As shown in Figure 8, a light spring 201 is coiled about a part of shaft 192 and has its ends so fastened to different parts of the magnet that its bias returns armature 119 into engagement with the pole faces after projection 117 has been swept past lug 118, thus returning the armature into position for immediate attraction by the magnet upon reenergization thereof.

As noted hereinabove, amplifier 32 (Figure 2) constitutes a unitary assembly which may be detachably mounted on cone 22. Accordingly we provide a mounting platform or bracket generally indicated at 202 (Figure 2) which is fastened at its upper end to cone 22 within the cone recess 109 by screws 203 and at its lower end by screws 204 (Figure 1). Bracket 202 supports the various elements of amplifier 32 and accordingly includes a lower platform 205 (Figure 2) having a downwardly extending plate 206 (Figure 1) on which is mounted a socket 207 in which tube 33 is mounted. The photoelectric tube, as shown in Figure 2, is accordingly disposed adjacent an opening 208 in the lower part of cone 22 and at the smaller end of a shield 209 fastened to the cone and extending through opening 208. Thus the photoelectric tube is shielded from all light other than that entering the shield or cone 209. Preferably we provide a shutter 210 (Figure 1) which is movable between the full and dotted line positions shown in this figure to shield from or expose the photoelectric tube to light entering cone 209. As shown in Figure 2, amplifier unit 32 is preferably provided with a cover plate 211 detachably fastened to struts 212 extending from cone 22.

To facilitate the electrical connection of amplifier unit 32 to the electrical system of the camera, the various electric responsive devices of the amplifier are wired to a suitable number of contacts, such as contact 213, secured to the upper part of bracket 202, and these contacts engage with other contacts, such as contact 214, mounted on the camera cone 22. Through the provision of these registering contacts, it is unnecessary to provide exterior wiring, sockets or other protruding electrical connectors. In the wiring diagram shown in Figure 12, these contacts or terminals are designated A—F.

Figure 13:
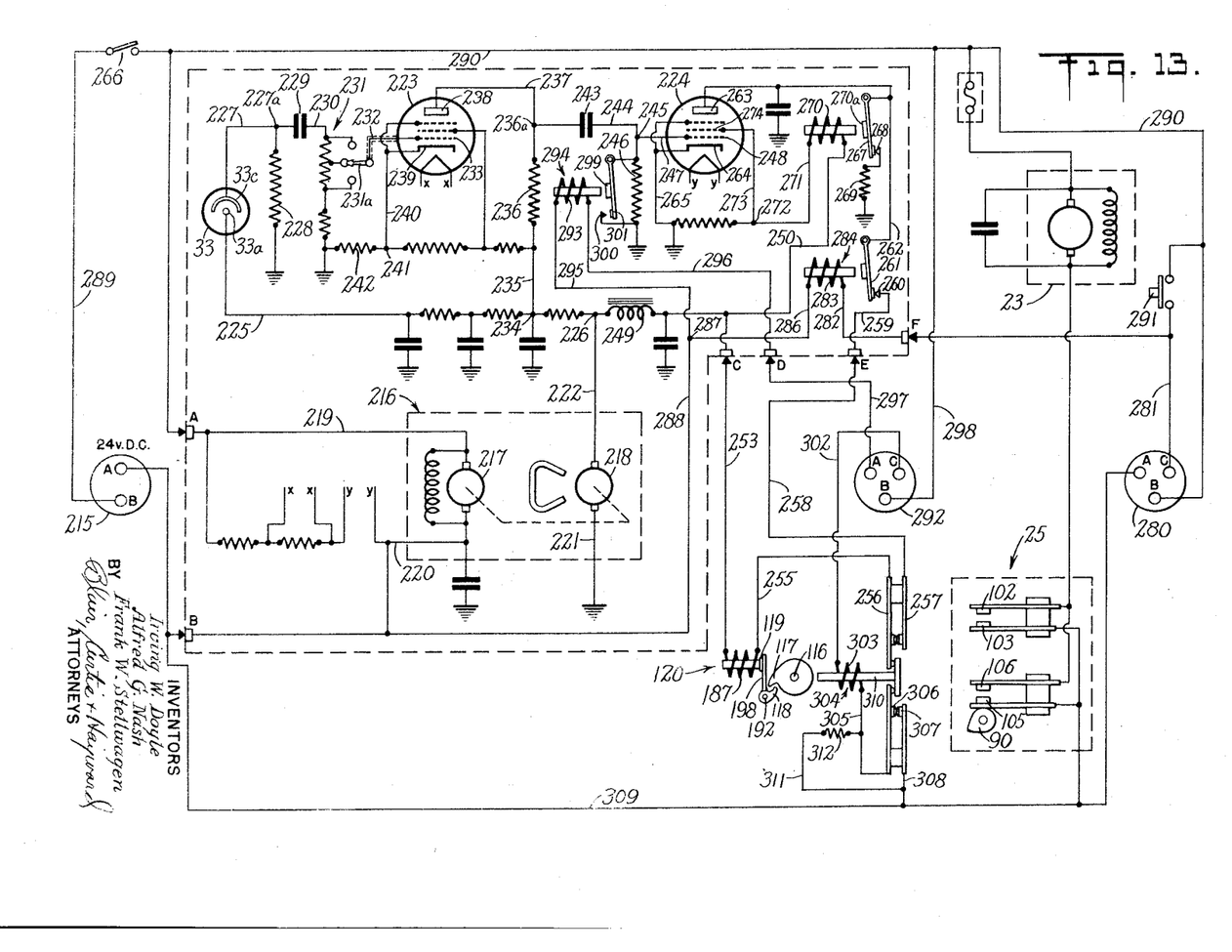

As shown in Figure 13, power is supplied to the circuit from a socket 215 which is connectable with the airplane power supply and the amplifier unit is connected to the socket. The amplifier unit includes a motor generator generally indicated at 216 comprising a motor 217 to which is coupled a generator 218. Motor 217 is connected to terminals A and B by leads 219 and 220, respectively. The negative side of generator 218 is connected to ground by a lead 221, while a lead 222, which supplies vacuum tubes 223 and 224, is connected to the positive side of the generator. Photoelectric tube 33, shown in the upper left-hand corner of the diagram, has its anode 33a connected by a lead 225 to a suitable number of series resistances which in turn are connected to a terminal 226 connected by lead 222 to the positive side of generator 218. Cathode 33c of the phototube is connected by a lead 227 through a high resistance 228 to ground. The phototube cathode is also connected by lead 227 to a condenser 229 in turn connected by a lead 230 to one side of a sensitivity control device 231, the control arm 231a of which is connected by a shielded lead 232 to the control grid 233 of vacuum tube 223.

Power is supplied from generator 218 to vacuum tube 223 by way of lead 222 and terminal 226 to a terminal 234 which is connected by a lead 235 to one side of a resistance 236. The other side of this resistance is connected by a lead 237 to the plate 238 of vacuum tube 223. The cathode 239 of the vacuum tube is connected by a lead 240 to a terminal 241 and thence through a resistance 242 to ground.

It will now appear that when light from an exploded flare strikes the cathode of phototube 33 current flows from the anode to the cathode of the tube and thence through lead 227 and resistance 228 to ground, with the result that the terminal 227a at the top of the resistance has a positive potential. This, in turn, through the coupling of condenser 229, effects a positive bias of control grid 233 of tube 223. This positive bias allows more current to flow from the generator to tube 223 through resistance 236, causing a voltage drop at terminal 236a at the top of resistance 236. This terminal 236a is coupled through a condenser 243 by a lead 244 to a terminal 245, the terminal in turn being connected through a resistance 246 to ground. Terminal 245 is also connected by a lead 247 to the control grid 248 of vacuum tube 224. Thus it will appear that upon a voltage drop at terminal 236a a minus potential is created at terminal 245, causing control grid 248 to have a negative bias. This negative bias stops the flow of current through vacuum tube 224 in a manner and for a purpose to be described.

Generator 218 supplies power to vacuum tube 224 as follows: lead 222, terminal 226, filter choke 249, lead 250, terminal 251, lead 252, terminal C, lead 253, coil 187 of holding magnet 120, lead 255, movable contact 256, stationary contact 257, lead 258, terminal E, lead 259, stationary contact 260, movable contact 261, lead 262, tube plate 263, tube cathode 264, and lead 265 to ground. The characteristics of tube 224 are such that when generator 218 is operating, current flows through the tube so that holding magnet 120 is energized, thus holding shutter cam 121 against rotation, as hereinbefore described. When, however, the phototube output is amplified, as described, and impressed as a negative bias on tube 224, current immediately ceases to flow through tube 224, resulting in immediate deenergization of holding magnet 120, and accordingly immediate release of shutter cam 121. Thus it may be seen that in an almost immeasurably small amount of time following the explosion of the flare, the camera shutter operates.

It might be noted that terminal A is connected to ground across the filament X—X of tube 223, and Y—Y of tube 224 to supply these filaments. It should also be noted that a main switch 266 is interposed between socket 215 and the connections to the amplifier unit by which the entire system may be turned off.

When the camera circuit is first turned on, vacuum tube 224 is in no condition to conduct current, as it takes an appreciable amount of time for its filament to heat up. Of course during this time no current can pass from the plate 263 to cathode 264, and consequently holding magnet 120 would be dead. This, in turn, would permit the shutter to trip as fast as it could be wound, and each time it was wound it would trip the case drive, start the motor, rewind the camera, and trip all over again. To preclude this an auxiliary path is provided for the current. Instead of passing from contacts 260 and 261 through vacuum tube 224 to ground, as described, the current passes from these contacts through a pair of contacts 267 and 268, through a resistance 269 to ground, thus permitting magnet coil 187 to be energized, even though tube 224 is non-conducting. When the tube finally warms up so that it can carry the current, additional current flows from filter choke 249 by way of lead 250, through a relay coil 270, and thence by a lead 271, terminal 272, and a lead 273 to a screen 274 of tube 224, thence to the tube cathode 264 to ground. Current flowing along this path causes actuation of the warm-up relay of which coil 270 is a part, drawing armature 270a toward the coil to separate contacts 267 and 268, thus rendering vacuum tube 224 the only path for the current which flows through holding magnet 120.

When the camera is used during the daytime, a device known as an intervalometer is used. This is a device comprising a timing mechanism driven by an electric motor, and while we have not shown it in the drawings, it is sufficient to note that this device is preferably located convenient to the operator who controls the operation of the camera. Thus the intervalometer is connected to the camera through a three pole socket 280 shown at the right central portion of Figure 12, having contacts A, B, and C. The intervalometer driving motor gets its power from the A and B contacts, and the camera is tripped by closing a contact within the intervalometer which connects contacts B and C. Contact C is connected by a lead 281 to terminal F, in turn connected by a lead 282 to the coil 283 of the trip relay generally indicated at 284. The other end of this relay coil is connected by lead 286, terminal 287, lead 288 and terminal B to socket 215, the other side of socket 215 being connected by lead 289, main switch 266 and lead 290 to contact B of the intervalometer socket 280. Thus when this circuit is closed, relay trip coil 283 is energized, separating contacts 260 and 261 and accordingly breaking the circuit through holding magnet 120 thus to trip the shutter. If desired, a manual tripping button 291 may be used to trip the shutter in the same manner. This manually actuated button 291 is preferably located on the camera case (see Figure 1).

Under certain circumstances, it is desirable to make a time exposure. To this end we have provided still another intervalometer (not shown) generally similar to the one referred to above, and also preferably located convenient to the camera operator. This second intervalometer is connected to the camera through a three pole socket 292 and gets its power from the A and B contacts of socket 292. When this intervalometer is turned on the current which energizes its driving motor flows through the coil 293 of a cutout relay generally indicated at 294 at the upper central portion of the diagram. One end of this relay coil 293 is connected by a lead 295 to lead 288 by terminal 287 and thence to post A of the source socket 215. The other side of relay coil 293 is connected by a lead 296 to terminal D and thence by a lead 297 to contact A of socket 292. Contact B of this socket is connected by a lead 298 to lead 290 and accordingly to post B of the source socket 215. Thus, when the intervalometer is turned on to energize relay 294, the relay armature 299 is attracted to close contacts 300 and 301, thus preventing any signal coming from phototube 33 from biasing control grid 248 of vacuum tube 224. This, in effect, paralyzes the phototube circuit and prevents the camera from tripping when a flash of light hits the photocell.

This second-mentioned intervalometer, when operating, also delivers a pulse to the bomb rack (not shown) on the airplane, wherein the flares are stored, to release a flare, and then after a certain number of seconds closes a connection from terminal B of socket 292 to terminal C thereof. This connection is timed to close a certain number of seconds before the flare is due to ignite.

The making of this connection between contacts B and C of socket 292 permits current to flow from post C through a lead 302 to one side of a coil 303 of a time exposure solenoid generally indicated at 304. The other side of coil 303 is connected by a lead 305 by way of contacts 306 and 307 and a lead 308 to a lead 309 going to post A of source socket 215. As the other side of this socket is connected to post B of intervalometer socket 292, the circuit to the time exposure solenoid 304 is completed when posts B and C of intervalometer socket 292 are connected.

When the time exposure solenoid 304 is energized, its plunger 310 is moved to the left, as viewed in Figure 13, causing contacts 256 and 257 to separate, thus breaking the circuit to holding magnet 120 which permits shutter cam 121 to start to revolve, as hereinbefore described. Also, this movement of solenoid plunger 310 separates contacts 306 and 307 in order to reduce the power input to the solenoid coil to prevent damage thereto from excessive heating. Thus, after the solenoid plunger has been retracted to open the contacts mentioned, current can still flow to coil 303 by way of lead 311, resistance 312, and lead 305. Resistance 312 reduces the power input to the solenoid coil to a safe value, although passing sufficient current to maintain the solenoid energized.

Solenoid 304 is also shown in Figures 5, 7, and 8 of the drawings, and accordingly includes an extension 313 adapted to engage and push against an arm 314 when the solenoid 304 is energized. Arm 314 is pivoted as at 315 and has connected to it in any suitable manner an arm 316 in the end of which is formed a slot 317. The arms on the end of arm 316 which form the slot embrace a pin 318 which pivotally connect a pair of toggle arms 319 and 320, the former of which is pivotally mounted on shaft 148. The free end of toggle arm 320 has a pin 322 fastened thereto which extends through a slot 323 cut in the top of casing 110. Thus it will appear that when the solenoid plunger moves upon energization of the solenoid, extension 313 (Figure 7) moves to the left to pivot arms 314 and 316 counterclockwise, causing the toggle joint formed by toggle arms 319 and 320 to straighten out to the position shown in Figure 7. This, in turn, causes pin 322 to move to the lower end of slot 323, as viewed in this figure.

The other end of pin 322 (Figure 6) is connected to a lever 324 pivotally mounted on stud shaft 150. This lever includes a stop arm 325 which, when solenoid 304 is energized, is moved counterclockwise to the position shown in Figure 6, wherein it engages cam stop 121a of the shutter cam 121 when this cam has rotated approximately 180°. Rotation of the cam to this extent is sufficient for the shutter leaves to open, and accordingly the shutter is held open when the solenoid 304 is energized. These several parts, which upon actuation hold the shutter cam 121 against further or shutter closing operation, are held in this position until solenoid 304 (Figure 13) is deenergized through operation of intervalometer 292. When the solenoid is thus deenergized, a spring 326 (Figure 7) which is fastened to arm 316 pulls arm 316 clockwise, as viewed in this figure, and this movement is transmitted by the toggle joints 319 and 320 and pin 322 to lever 324 (Figure 6) causing this latter lever to rock clockwise as viewed in Figure 6, thus to move its stop arm 325 away from cam stop 121a, permitting the shutter cam 121 to complete its rotation. As described hereinabove, this latter motion of the shutter cam causes the case drive to trip and the camera to rewind.

In the event that the retard segments 149 and 159 (Figure 6) happen to be adjusted for slow speed operation when the camera is operated for time exposure, they might impose sufficient drag on the shutter so that the shutter spring's power would be insufficient to close the shutter after being held open by the time exposure mechanism just described. Accordingly we provide a pin 327 (Figure 5) on one end of the solenoid plunger 310 which upon energization of the solenoid engages one end of a lever 328 to rock this lever counterclockwise. This lever is attached to shaft 178 and accordingly when the lever is rocked, shaft 178 (Figure 4), lever 176, link 169, arm 168, and shaft 166 are moved in such manner as to move the retard segments 149 and 159 out of the path of cam 152 on shutter cam 121, thus leaving cam 121 absolutely free to close when the solenoid is deenergized.

It accordingly may be seen that we have provided a camera which fulfills the several objects set forth hereinabove in a thoroughly practical and efficient manner.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

We claim:

1. In a camera, in combination, a shutter, shutter operating mechanism, means including a trip for actuating said operating mechanism, magnetic means for retaining said trip in shutter holding position and adapted upon deenergization to release said trip, magnetic means adapted when energized to stop said shutter operating mechanism during its operation at a position wherein the shutter is held open, and means for simultaneously deenergizing said first magnetic means and energizing said second magnetic means to open said shutter and hold it open.

2. In a camera, in combination, a shutter, shutter operating mechanism, means including a trip for actuating said operating mechanism, magnetic means for retaining said trip in shutter holding position and adapted upon deenergization to release said trip, magnetic means adapted when energized to stop said shutter operating mechanism during its operation at a position wherein the shutter is held open, means for simultaneously deenergizing said first magnetic means and energizing said second magnetic means to open said shutter and hold it open, and means for simultaneously deenergizing said second magnetic means and energizing said first magnetic means to close said shutter and hold it closed.

3. In a camera, in combination, a shutter, shutter operating mechanism, means operable for retarding the operation of said mechanism to regulate the period of time said shutter remains open, means including a trip for actuating said operating mechanism, magnetic means for retaining said trip in shutter holding position and adapted upon deenergization to release said trip, magnetic means adapted when energized to stop said shutter operating mechanism during its operation at a position wherein the shutter is held open, means for simultaneously deenergizing said first magnetic means and energizing said second magnetic means to open said shutter and hold it open, and means operated by said second magnetic means upon energization thereof for disabling said retarding means.

4. In a camera, in combination, a cone, driving mechanism mounted on said cone, an assembly including a shutter and shutter operating mechanism detachably mounted within said cone, means forming driving connections between said driving mechanism and said assembly, said shutter operating mechanism including a rotatable shaft and a first stop connected to the shutter, a spring associated with said shaft for opening and closing the shutter, a second stop secured to one end of said spring and also fastened to said shaft, magnetic means mounted on said assembly and normally energized for holding said second stop in spring retaining position, a cam freely mounted on said shaft and secured to the other end of said spring so as to rotate when the spring is rewound, lever means associated with said cam and adapted to be rocked thereby, and a holding member connected to said lever means and associated with said first stop, said holding member adapted to be rocked out of its stop holding position during rotation of said cam as said spring is rewound after exposure operation of the shutter.

5. Apparatus according to claim 4 wherein said driving mechanism includes a cyclically operated motor connected to said spring through one of said driving connections for tensioning said spring, and means associated with said shaft and effective upon rotation thereof during exposure operation of the shutter for causing energization of said motor to rewind said spring.

6. Apparatus according to claim 4 wherein said driving mechanism includes a cyclically operated motor connected to said spring through one of said driving connections for tensioning said spring, a cam secured to said shaft so as to rotate therewith during exposure operation of the shutter, and means connected to another of said driving connections and operated by said last-mentioned cam for effecting energization of said motor to rewind said spring.

7. In a camera, in combination, a cone, driving mechanism mounted on said cone, an assembly including a shutter and shutter operating mechanism detachably mounted within said cone, means forming driving connections between said driving mechanism and said assembly, said shutter operating mechanism including a rotatable shaft and a first stop connected to the shutter, a spring associated with said shaft for opening and closing the shutter, a second stop secured to one end of said spring and also fastened to said shaft, magnetic means mounted on said assembly and normally energized for holding said second stop in spring retaining position, a cam freely mounted on said shaft and secured to the other end of said spring so as to rotate when the spring is rewound, lever means associated with said cam and adapted to be rocked thereby, a holding member connected to said lever means and associated with said first stop, said holding member adapted to be rocked out of its stop holding position during rotation of said cam as said spring is rewound after exposure operation of the shutter, and spring means for normally maintaining said holding member out of holding position relative to said first stop.

8. In a camera, in combination, a shutter, shutter operating mechanism, means for actuating said operating mechanism, magnetic means for maintaining said actuating means in a position wherein the shutter is held closed and adapted upon deenergization to release said actuating means to open said shutter, magnetic means adapted when energized to stop said shutter operating mechanism during its operation at a position wherein the shutter is held open, and means for simultaneously deenergizing said first magnetic means and energizing said second magnetic means to open said shutter and hold it open.

9. In a camera, in combination, a shutter, shutter operating mechanism, means for actuating said operating mechanism, magnetic means for maintaining said actuating means in a position wherein the shutter is held closed and adapted upon deenergization to release said actuating means to open said shutter, magnetic means adapted when energized to stop said shutter operating mechanism during its operation at a position wherein the shutter is held open, means for simultaneously deenergizing said first magnetic means and energizing said second means to open said shutter and hold it open, and means for simultaneously deenergizing said second magnetic means and energizing said first magnetic means to close said shutter and hold it closed.

10. In a camera wherein energizable means are provided for holding when energized a stop for a spring driven shutter and for releasing said stop when deenergized, said camera also including a circuit for said energizable means including a vacuum tube having a control electrode and a source of electric power for supplying power through said tube to said energizable means, said circuit also including means responsive to a flash of light for impressing a bias on the control electrode of said tube to stop immediately the flow of current therethrough and accordingly through said energizable means, thereby to deenergize said energizable means and effect shutter operation, that improvement which consists in providing circuit means for bypassing said electric power to said energizable means around said tube while the tube is non-conductive during its warm up period so that said energizable means may be energized while said tube is warming up.

11. In a camera wherein energizable means are provided for holding when energized a stop for a spring driven shutter and for releasing said stop when deenergized, said camera also including a circuit for said energizable means including a vacuum tube having a control electrode and a source of electric power for supplying power through said tube to said energizable means, said circuit also including means responsive to a flash of light for impressing a bias on the control electrode of said tube to stop immediately the flow of current therethrough and accordingly through said energizable means, thereby to deenergize said energizable means and effect shutter operation, that improvement which consists in providing circuit means for bypassing said electric power to said energizable means around said tube while the tube is non-conductive during its warm up period so that said energizable means may be energized while said tube is warming up, and means responsive to said tube becoming conductive for disabling said bypassing means.

IRVING W. DOYLE.
ALFRED G. NASH.
FRANK W. STELLWAGEN.